(12) United States Patent  
Filippov et al.

(10) Patent No.: US 10,287,856 B2  
(45) Date of Patent: May 14, 2019

(54) OPTIMIZED FLOW CONTROL DEVICE PROPERTIES FOR ACCUMULATED GAS INJECTION

(71) Applicant: Landmark Graphics Corporation, Houston, TX (US)

(72) Inventors: Andrey Filippov, Houston, TX (US); Jianxin Lu, Bellaire, TX (US); Vitaly Anatolievich Khoriakov, Calgary (CA)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 235 days.

(21) Appl. No.: 15/104,156

(22) PCT Filed: Oct. 10, 2014

(86) PCT No.: PCT/US2014/060171  
§ 371 (c)(1),  
(2) Date: Jun. 13, 2016

(87) PCT Pub. No.: WO2015/112210  
PCT Pub. Date: Jul. 30, 2015

(65) Prior Publication Data  
US 2016/0312585 A1 Oct. 27, 2016

Related U.S. Application Data

(60) Provisional application No. 61/931,238, filed on Jan. 24, 2014.

(51) Int. Cl.  
*E21B 41/00* (2006.01)  
*E21B 43/12* (2006.01)  
(Continued)

(52) U.S. Cl.  
CPC .......... *E21B 41/0092* (2013.01); *E21B 43/12* (2013.01); *E21B 43/14* (2013.01);  
(Continued)

(58) Field of Classification Search  
CPC ...................................................... E21B 43/12  
See application file for complete search history.

(56) References Cited

U.S. PATENT DOCUMENTS 5,186,255 A 2/1993 Corey  
2002/0049575 A1 4/2002 Jalali et al.  
(Continued)

OTHER PUBLICATIONS

International Search Report and The Written Opinion of the International Search Authority, or the Declaration, dated Jan. 27, 2015, PCT/US2014/060171, 11 pages, ISA/KR.  
(Continued)

*Primary Examiner* — Manuel A Rivera Vargas

(57) ABSTRACT

A computer implemented method, system, and computer program product are provided for determining flow control device (FCD) properties for a gas injection well that would yield a prescribed shape of a gas injection front according to a target gas injection profile. An FCD distribution function is adjusted based on the results of a simulation of injected gas flow distribution in the gas injection well over a period of time. The simulation and resulting adjustment of the FCD distribution function is repeated until a convergence between a shape of a displaced oil volume front obtained using the adjusted flow control device distribution function and a target gas injection profile is reached within a predetermined convergence range. The FCD properties are then determined based on the adjusted FCD distribution function.

20 Claims, 5 Drawing Sheets

(51) Int. Cl.
| | |
|---|---|
| *E21B 43/14* | (2006.01) |
| *E21B 43/16* | (2006.01) |
| *G01B 21/20* | (2006.01) |
| *G05B 13/04* | (2006.01) |
| *G05D 7/06* | (2006.01) |
| *G06F 17/11* | (2006.01) |
| *G06F 17/50* | (2006.01) |

(52) U.S. Cl.
CPC ............ *E21B 43/168* (2013.01); *G01B 21/20* (2013.01); *G05B 13/041* (2013.01); *G05D 7/0635* (2013.01); *G06F 17/11* (2013.01); *G06F 17/5009* (2013.01); *G06F 2217/16* (2013.01)

(56) References Cited

U.S. PATENT DOCUMENTS

| | | | |
|---|---|---|---|
| 2008/0149203 | A1 | 6/2008 | Atkinson et al. |
| 2008/0264635 | A1 | 10/2008 | Chhina et al. |
| 2010/0299124 | A1 | 11/2010 | Sun et al. |
| 2012/0278053 | A1* | 11/2012 | Garcia ................. E21B 43/00 703/10 |
| 2013/0199774 | A1 | 8/2013 | Sultenfuss et al. |

OTHER PUBLICATIONS

Kaiser, et al., "Inflow Analysis and Optimization of Slotted Liners," SPE/Petroleum Society of CIM, International Conference on Horizontal Well Technology, Nov. 6-8, 2000, Calgary, Alberta, Canada.

Sarma, et al., "Implementation of Adjoint Solution for Optimal Control of Smart Wells," Society of Petroleum Engineers, Reservoir Simulation Symposium, Jan. 31-Feb. 2, 2005, Houston, Texas, U.S.A.

Sharma, et al., "Integration of Dynamic Modeling of ICD Completion Design and Well Placement Technology: A Case Study of GOM Shelf Reservoir," Society of Petroleum Engineers, Annual Technical Conference and Exhibition, Oct. 30-Nov. 2, 2011.

Su, et al. "Modeling of Equalizer Production System and Smart-Well Applications in Full-Field Studies," Society of Petroleum Engineers, SPE/EAGE Reservoir Characterization and Simulation Conference, Oct. 28-31, 2007, Abu Dhabi, UAE.

Thornton, et al., "Optimization of Inflow Control Device Placement and Mechanical Conformance Decisions Using a New Coupled Well-Intervention Simulator," Society of Petroleum Engineers, International Petroleum Exhibition and Conference, Nov. 11-14, 2012, Abu Dhabi, United Arab Emirates.

Yeten, et al., "Optimization of Smart Well Control," SPE/Petroleum Society of CIM/CHOA, International Thermal Operations and Heavy Oil Symposium and International Horizontal Well Technology Conference, Nov. 4-7, 2002, Calgary, Alberta, Canada.

European Patent Office, Supplementary European Search Report, dated Oct. 18, 2017, 8 pages, Europe.

Mohammad Kyanpour and Zhangxing Chen, A New Approach for Designing Steam Splitters and Inflow Control Devices in Steam Assisted Gravity Drainage, Jun. 11-13, 2013, 14 pages, SPE165487, SPE Heavy Oil Conference, Society of Petroleum Engineers, Calgary, Alberta, Canada.

* cited by examiner

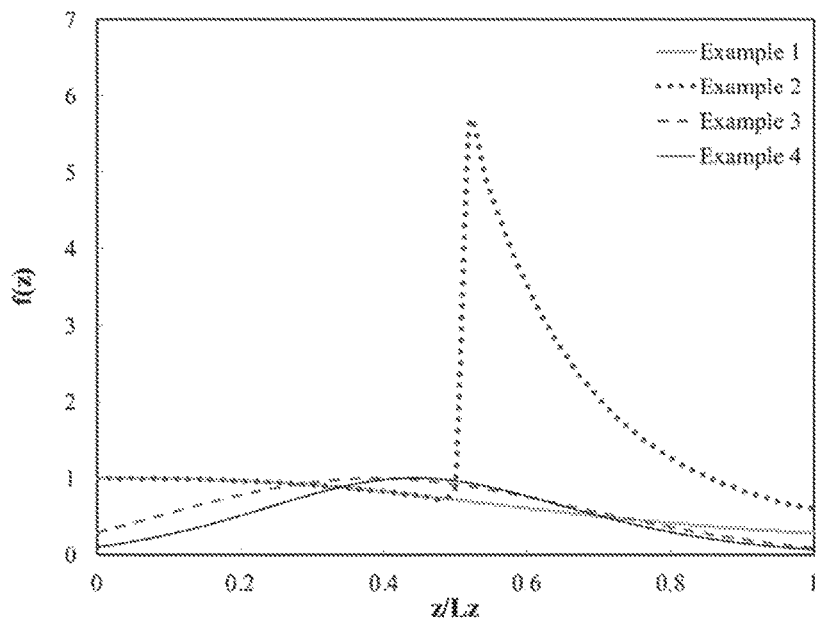
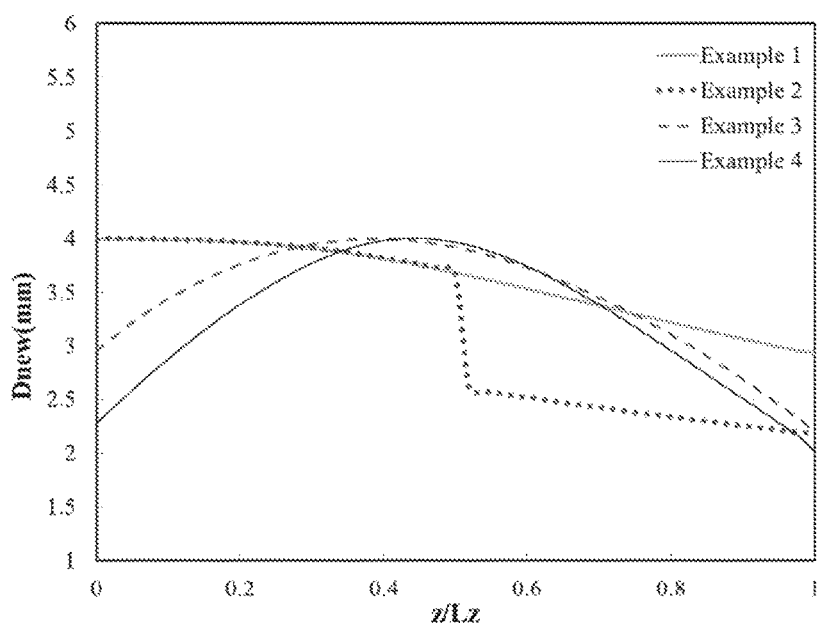

OPTIMIZED FLOW CONTROL DEVICE PROPERTIES FOR ACCUMULATED GAS INJECTION

CROSS-REFERENCE TO RELATED APPLICATIONS

The present application is a U.S. National Stage patent application of International Application No. PCT/US2014/060171, filed on Oct. 10, 2014, which claims the benefit of U.S. Provisional Patent Application No. 61/931,238, filed on Jan. 24, 2014, titled "Optimized Flow Control Device Properties for Accumulated Gas Injection," both of which are incorporated herein by reference in their entirety.

BACKGROUND

1. Field

The present disclosure relates generally to the recovery of subterranean deposits and more specifically to methods and systems for optimizing the placement and other properties of one or more flow control devices along a gas injection well for the purpose of improving recovery from a reservoir.

2. Discussion of the Related Art

As the oil or natural gas in a formation is produced, the hydrocarbons remaining in the reservoir may become trapped because the pressure in the formation has lessened, making production either slow dramatically or stop altogether. Gas injection refers to the method in the oil industry where gas is injected into the reservoir using gas-injection wells to increase pressure and stimulate production. For example, in certain instances, the injected gas effectively sweeps the formation for remaining petroleum and pushes it towards a production well, thus, keeping the production rate and the pressure the same over the long term.

However, gas injection wells frequently suffer from imbalanced placement of the injected gas due to one or more of the zones accepting excessive injection rates and volume. The primary reason for this is permeability differences or thief zones along the well bore. For example, horizontal wells typically have higher injection or production flow rates at the heel. With imbalances in the injection rates, problems can arise including ineffective reservoir drainage and early breakthrough at production wells. Thus, solutions are needed to overcome the imbalanced placement of the injected gas.

BRIEF DESCRIPTION OF THE DRAWINGS

Illustrative embodiments of the present disclosure are described in detail below with reference to the attached drawings, which are incorporated herein by reference and wherein:

FIG. 6 is a diagram that illustrates an example of a graph that depicts the optimal flow control device flow penetration functions $f(z)$, which yield the desired cumulative gas injection profiles in accordance with the disclosed embodiments;

FIG. 7 is a diagram that illustrates an example of a graph that depicts the optimal flow control device nozzle size distributions along the length of the wellbore in accordance with the disclosed embodiments.

DETAILED DESCRIPTION

Figure 1:
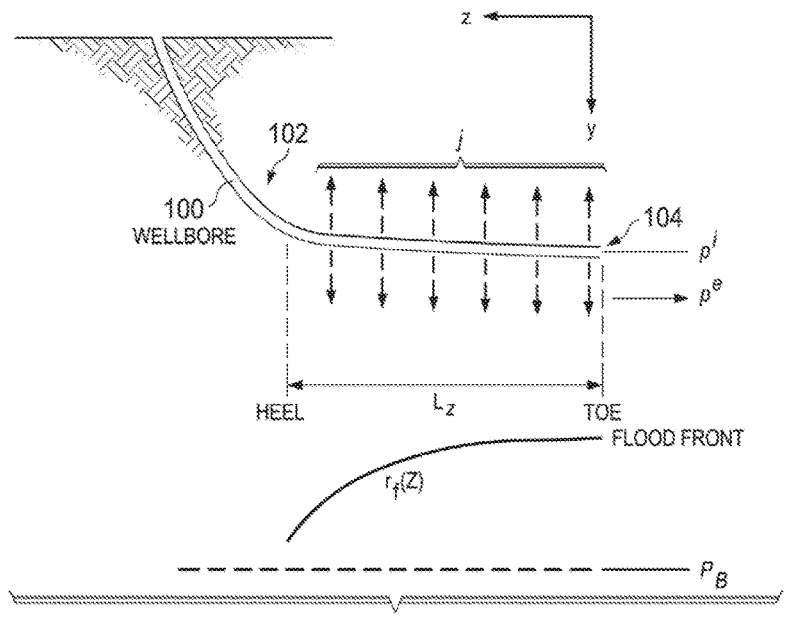
FIG. 1 is a diagram depicting an exemplary scheme of a horizontal injection well in accordance with the disclosed embodiments.

As stated above, gas injection wells frequently suffer from imbalanced placement of the injected gas due to one or more of the zones accepting excessive injection rates and volume. In accordance with the disclosed embodiments, one method to counter this imbalance is to use one or more flow control devices (FCDs) along the gas injection well to balance the gas injected into the formation. To improve hydrocarbon recovery, the completion design must account for various factors that may affect production including, but not limited to, the drawdown from heel to toe, locations of other wells, and reservoir heterogeneity. In addition, for optimal productivity, the FCD design needs to be linked to a model accounting for the physical characteristics of the reservoir and wellbore. Additionally, the model must predict the time-dependent expansion dynamics of the displaced oil volume.

As referenced herein, a flow control device is any device that is coupled to a wellbore that causes a pressure drop between the wellbore and a reservoir to reduce flow between the wellbore and the reservoir at the location of the flow control device. For instance, in certain embodiments, an inflow Control device (ICD), as known in the art, may be used in connection with a gas injection well to balance the gas injected into the formation. In this case, the ICD would act as an injection control device, as opposed to an inflow control device, as it would perform the reverse action of controlling flow of the injected gas from the base pipe to the annulus. A non-limiting example of a flow control device in accordance with the disclosed embodiments is the Equi-Flow® Inject system available from Halliburton®.

However, to date, no easy methods for determining the proper placement or selection of flow control devices or for predicting the time-dependent expansion dynamics of the displaced oil volume have been developed. Instead, current methods rely on a manual trial and error process in which various sizing/types and placement of flow control devices are simulated along a horizontal well using simulation software, such as NETool™ available from Landmark Graphics Corporation.

Therefore, in accordance with the disclosed embodiments, a numerical model and a simulation process are proposed for determining optimal FCD properties that would yield a prescribed profile of cumulative displaced oil volume in a formation under gas injection stimulation. In an embodiment, an FCD distribution function may be adjusted based on flow simulation results to yield a desired shape of a gas injection front according to a target profile (also referred to herein as "target gas front profile" or "target gas injection profile"). The adjusted FCD distribution function can then be used to determine the optimal FCD properties along a gas injection well. Examples of such FCD properties include, but are not limited to, FCD placement and other design parameters (e.g., number of holes and hole sizes, and/or number and types of FCDs). In contrast to injected liquid, the compressibility of gas precludes the use of an analytical, quasi-steady logarithmic profile for effectively determining pressure distribution. Instead, in accordance with the disclosed embodiments, the pressure distribution is found at each time step by numerically solving a transient boundary problem for the gas diffusion equation.

The disclosed embodiments will be illustrated using an example of a simplified coupled tank reservoir-wellbore hydrodynamic model, which accounts for FCD impact on the gas behavior in the injector well and within the formation. The disclosed embodiments and methodology can be applied to coupled reservoir-wellbore models of varying levels of complexity. In addition, although methane is used in the examples described below, the disclosed embodiments are applicable for any type of gas.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiments were chosen and described to explain the principles of the invention and the practical application, and to enable others of ordinary skill in the art to understand the claimed inventions.

Beginning with FIG. 1, a diagram depicting an exemplary scheme of a horizontal injection well 100 is presented. The injection well 100 includes an upstream end 102 and downstream end 104. The upstream end 102 is known in the art as the heel of the well and the downstream end 104 is known as the toe. In addition, several parameters described herein are also indicated on FIG. 1. In particular, z is the horizontal coordinate; Lz is the wellbore length; Pi is the wellbore pressure, Pe is the annulus pressure, $P_B$ is the reservoir boundary pressure, j is the volumetric flow rate of injected gas per unit length of the wellbore (e.g., number of gallons per meter). The shape of the boundary of injected gas volume may be axially symmetric and may be described by the function r=rf(z, t). This boundary can be considered, for example, a moving front, separating the injected gas volume, e.g., r<rf(z, t) from the oil in the reservoir formation, as shown in FIG. 2.

Figure 2:
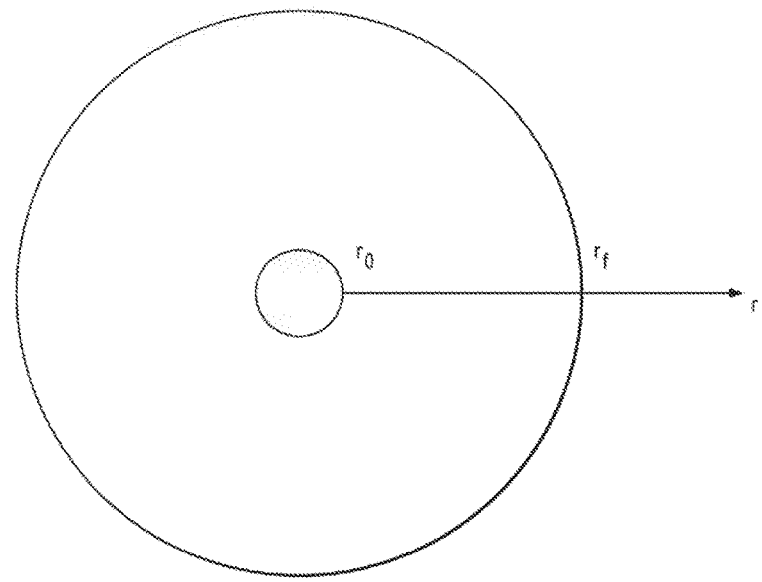
FIG. 2 is a diagram indicating an example of the geometry of the boundary of a displaced oil volume in relation to a gas injection well in accordance with a disclosed embodiment.

FIG. 2 is a diagram indicating an example of the geometry of a boundary of a displaced oil volume $r_f$ in relation to the injected gas volume for the injection well 100 of FIG. 1, as described above. In accordance with the disclosed embodiments, gas and oil are immiscible. The inside of the injected volume boundary (e.g., r<rf) is composed entirely of gas phase, which is compressible. The transient pressure distribution and the gas flow in porous media are described by equation:

$$r < r_f: \phi c_g \frac{\partial p}{\partial t} = \frac{1}{r}\frac{\partial}{\partial r}\left(r\lambda \frac{\partial p}{\partial r}\right) c_g = \frac{1}{Z}\left(1 - \frac{dZ}{dp}\frac{p}{Z}\right); \quad (1)$$

$$\lambda = \frac{p}{Z}\frac{k_g}{\mu_g}$$

where the formation porosity $\phi$ and temperature T are constant and, Z is the compressibility factor. Since the radial position of the front $r_f$ is increasing at each time step as the gas front propagates, the gas-filled zone is expanding. So for the discretizing grid, either the total number of grids will increase if the grid sizes are fixed, or the grid sizes should increase if the total grid number is fixed. It may be helpful to use a normalized coordinate $\xi$, as shown in the equations below:

$$\xi = \frac{r - r_0}{r_f - r_0} \quad (2)$$

$$r = \xi(r_f - r_0) + r_0 \quad (3)$$

All points in the interval of r between the sandface and the front have values of $\xi$ between 0 and 1 so that a fixed grid can be used for that domain.

Substituting r in Equation (1) with Equation (3) yields Equation (4):

$$\phi c_s \frac{\partial p}{\partial t} = \frac{1}{[\xi(r_f - r_0) + r_0]} \frac{1}{(r_f - r_0)} \frac{1}{\partial \xi}\left[(\xi(r_f - r_0) + r_0)\lambda \frac{\partial p}{\partial \xi}\frac{1}{(r_f - r_0)}\right] \quad (4)$$

Equation (4) is discretized and solved implicitly using, for example, backward time differentiation. The Thomas Algorithm may then be applied to iteratively calculate the pressure distribution and gas density in the gas-filled zone. In contrast with the gas phase inside the injected volume boundary, the oil phase outside of the injected volume is incompressible. The pressure is quasi-steady and may be described using Equation (5):

$$r > r_f: p = p_f + \frac{(p_B - p_f)}{\ln\left(\frac{r_B}{r_f}\right)}\ln\left(\frac{r}{r_f}\right) \quad (5)$$

where $r_B$ is the radial coordinates of the reservoir boundary, $p_B$ is the pressure at reservoir boundary, and $p_f$ is the pressure at the front.

Due to the compressibility of injected gas, both the volumetric and massive flow rate will vary along the propagating direction. The mass flow rate $J_i$ on the upstream side near the FCD nozzle can be described using Equation (6):

$$J_i^2 = \sigma f(z) p_i^2 \frac{W}{Z(p_i)RT_i} \left(\frac{m}{m-1}\right)\left[\left(\frac{p_e}{p_i}\right)^{2/m} - \left(\frac{p_e}{p_i}\right)^{(m+1)/m}\right] \quad (6)$$

where $$f(z) = \left(\frac{s_{or}}{s_{or}^0}\frac{L_{or}^0}{L_{or}}\right)^2 \text{ and } \sigma = 2\left(\frac{Cs_{or}^0}{L_{or}^0}\right)^2,$$

$p_e$ is the pressure at the wellbore surface (e.g., the downstream flow pressure of the nozzle), $p_i$ is the pressure inside the pipe (e.g., the upstream flow pressure of the nozzle), C is the orifice flow coefficient, $s_{or}$ is the cross-section area of the nozzle, $L_{or}$ is the spacing of the nozzles along the pipe (for which superscript 0 denotes the default site and nozzle spacing), and m is the specific heat ratio equal to $C_p/C_v$ and is dimensionless. Function $f(z)$ characterizes the variation of hole diameter or linear density of the FCD devices along the injection well 100. An increase of $f(z)$ results in a reduction of the pressure drop across the FCD wall and therefore in an influx increase of reservoir fluids.

The gas flow in the wellbore is described by the following coupled equations, where Equation (7) is the continuity equation, Equation (8) is the momentum balance equation, and Equation (9) describes the propagation velocity of the front:

$$\frac{dq_i}{dz} = J_i; \quad q_i = \rho_i V_i A \quad (7)$$

$$\frac{dp_i}{dz} = \frac{1}{2D_i} f_d \rho_i V_i^2 = \frac{1}{2D_i A^2} f_d \frac{ZRT}{p_i W} q_i^2 \quad (8)$$

$$\frac{dr_f}{dt} = V_{fo} = -\frac{k_o k_o'}{\mu_o \Delta S_o \phi} \frac{(p_B - p_f)}{\ln\left(\frac{r_B}{r_f}\right)} \frac{1}{r_f} \quad (9)$$

where $q_i$ is the mass flow rate of injection gas in the wellbore, $\rho_i$ is injection has density, $k_o$ is the absolute permeability of the formation, $k'_o$ is the relative permeability of oil, $\mu_o$ is dynamic viscosity of oil, and $\phi$ is reservoir porocity. The relative permeability depends on the saturation of the rock with original and injected gas. $V_i$ in Equations (7) and (8) above is the gas front propagation velocity, A is the inner cross-section area of the wellbore, $\Delta S_o$ is the change of saturation of the injected gas at the displacement front, and $f_d$ is the Darcy friction coefficient, which accounts for friction loss in pipe flow as well as open channel flow. In one embodiment, the Darcy friction factor is determined using the Haaland equation, as shown below in Equations (10) and (11). Other equations including, for example and without limitation, the Colebrook-White equation, the Swamee-Jain equation, and the Gondar equation may also be used to determine the Darcy friction factor in accordance with the disclosed embodiments.

$$Re = \frac{\rho V D}{\mu}, \text{ where } Re \text{ is the Reynolds number.} \quad (10)$$

$$f_d = \begin{cases} 64/Re, & \text{if } Re < 2300; \\ \left\{-1.8\log_{10}\left[\left(\frac{\varepsilon/D}{3.7}\right)^{30/9} + \frac{6.9}{Re}\right]\right\}^{-2}, & \text{if } Re > 2300. \end{cases} \quad (11)$$

By using the above-described equations, the disclosed embodiments provide a simulation process for determining the optimal FCD design properties that would yield a prescribed shape of the injection front for a particular gas injection well. Such properties may include, for example, optimal FCD placement and other relevant FCD properties that would produce a desired profile of cumulative injected gas volume in the formation. An optimal FCD design or other property may be characterized by, for example, the function $f(z)$, as described above, and a prescribed shape of the injection front may be characterized by the function $r_f = F(z)$.

Figure 3:
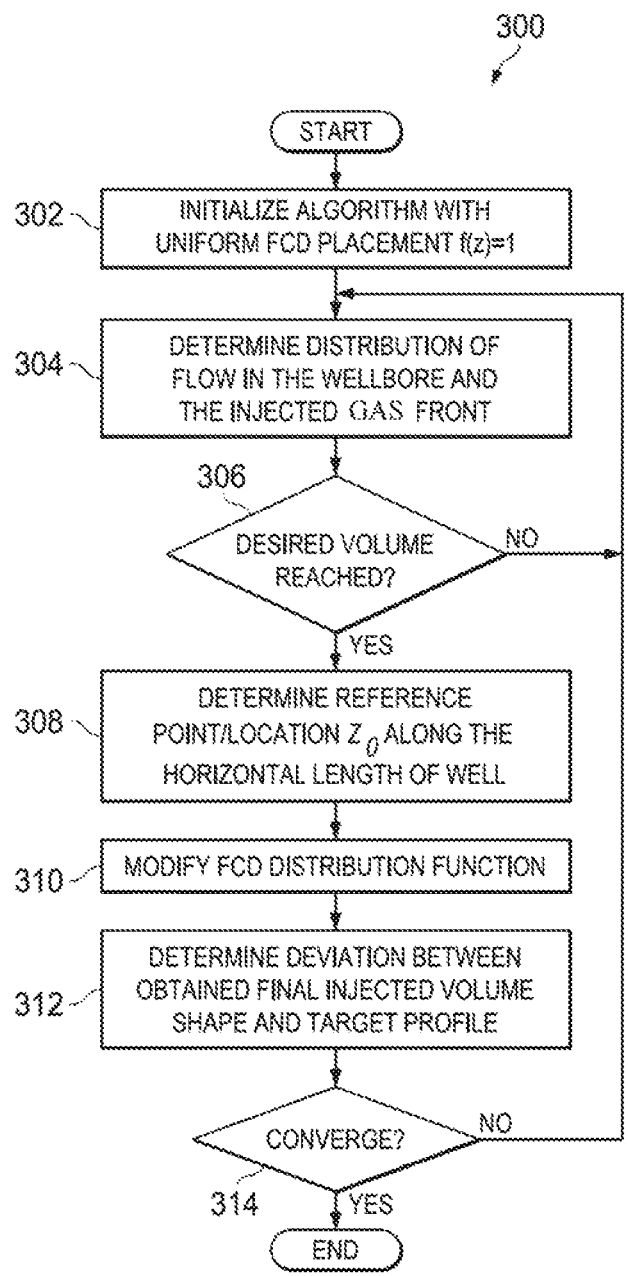
FIG. 3 is a flowchart depicting an example of a computer-implemented method for determining the optimum flow control device properties that yield to a prescribed shape of the injection front in accordance with the disclosed embodiments.

For example, FIG. 3 illustrates a flowchart depicting an example of computer-implemented method 300 for determining the optimal FCD design, placement, and other properties, characterized by function $f(z)$ for a as injection well that yields to a prescribed shape of the injection front in accordance with the disclosed embodiments. As shown in FIG. 3, method 300 begins at step 302 by using an initial uniform FCD placement to initialize the FCD function $f(z)$, as characterized by Equation (12):

$$f(z) = f_0(z) = 1; \quad 0 \leq z \leq L_z \quad (12)$$

At step 304, the evolution of the displacement front $r_f(z, t)$ is determined. For example, in one embodiment, step 304 may include using the Runge-Kutta integration methods, as expressed by Equations (7) and (8) above, for approximating a solution to Equation (9), described above. In one embodiment, in order to find the new position of $r_f$, the gas pressure distribution and the gas front pressure are calculated at each time step over a period of time to solve the discretized form of Equation (4) (e.g., using the Thomas method). The time-dependent distributions of pressure and flow rate in the wellbore are also calculated at each time step, e.g., by using the Runge-Kutta integration of Equations (7) and (8), as described above.

Step 306 includes determining whether the desired volume of displaced oil $V_0$ has been reached. If the desired volume of displaced oil $V_0$ has not been reached, method 300 repeats step 304. In other words, the time integration stops at time $t = t_m$ when the desired volume of displaced oil $V_0$ has been reached, as expressed by Equation (13):

$$\pi \int_0^L [r_f^n(z, t_m)]^2 dz = V_0 \quad (13)$$

where n is the iteration number and $V_0$ is a given injection volume. $V_0$ may be expressed as follows using Equation (14):

$$V_0 = \pi \int_0^{L_z} F^2(z) dz \quad (14)$$

If the current injected volume has reached the desired volume of displaced oil $V_0$, method 300 proceeds to step 308, which includes determining a reference point/location $z_0$ along the horizontal production length of the wellbore, which satisfies the following condition/equation:

$$\frac{r_f^1(z_0, t_m)}{F(z_0)} = \min\left[\frac{r_f^1(z, t_m)}{F(z)}\right]; 0 \leq z \leq L_z \quad (15)$$

In one embodiment, the reference point $z_0$ and the corresponding value of the FCD distribution function $f(z_0)$ remains fixed for all of the following iterations:

$$f_n(z_0)=1; n=1,2,\ldots \quad (16)$$

where n is the iteration number.

At step 310, based on the results of the determination in step 304, the FCD distribution function is adjusted or modified by increasing values of the FCD distribution function at points where the front $r_f^n$ is not sufficiently advanced relative to the target F(z), i.e., where $r_f^n < F(z)$, and decreases at the points of overshoot, where $r_f^n > F(z)$. For example, in one embodiment, step 310 may include using the following equation for performing the adjustment:

$$f^{n+1}(z) = \left[\frac{r_f^n(z_0, t_m)}{F(z_0)} \frac{F(z)}{r_f^n(z, t_m)}\right]^4 f^n(z) \quad (17)$$

Method 300 then proceeds to step 312, which includes determining the deviation/difference $\Delta$ between the obtained final shape of the displaced oil volume and the target profile, e.g., using Equation (18):

$$\Delta = \left(\pi \int_0^L [r_f^n(z, t_m) - F(z)]^2 dz\right) \quad (18)$$

At step 314, the process determines whether the deviation is within a predetermined convergence value (i.e., whether $\Delta < aV_0$). For example, the variable $\varepsilon$ may be of the order $10^{-5}$. If the deviation is not within the predetermined convergence value, method 300 returns to step 302 and repeats the above-disclosed process. However, if the deviation is within the predetermined convergence value, then method 300 determines that the corresponding function $f^{n+1}(z)$ yields the optimal FCD properties and terminates thereafter.

In one embodiment, the above disclosed simulation process may be applied to a numerical model developed based on the finite difference solution of Equations (4-9), which may be programmed in, for example, a MATLAB® code. However, the disclosed embodiments are not limited thereto and may be implemented using any type of programming language and in other software applications.

To help further describe the disclosed embodiments, FIGS. 4-7 illustrate four examples that demonstrate how the disclosed embodiments can be applied in various practical situations with different relative permeabilities of gas and oil and target gas injection front profiles, as listed in the table below:

| Example | Gas/oil permeability | Targeted gas front profile |
|---|---|---|
| 1 | Homogenous | Uniform |
| 2 | Step wise | Uniform |
| 3 | Parabolic | Uniform |
| 4 | Homogenous | Parabolic |

In the given examples, it is assumed that the horizontal injection well has a diameter of 0.10 m and a length of 2500 m. Methane was chosen as the injection gas with viscosity $13.8 \times 10^{-6}$ Pa s at p=100 bar and T=273 K, while the reservoir absolute permeability is set to 0.5 Darcy. The FCD base hole diameter $D_{or}$ is 4 mm with spacing $L_{or}$ equal to 12 m. The reservoir boundary pressure $p_B$ is set as a constant value both along the well and in time. One of ordinary skill in the art would recognize that the disclosed embodiments are not limited to the above example parameters and may vary depending on the actual parameters of a particular well.

Figure 4:
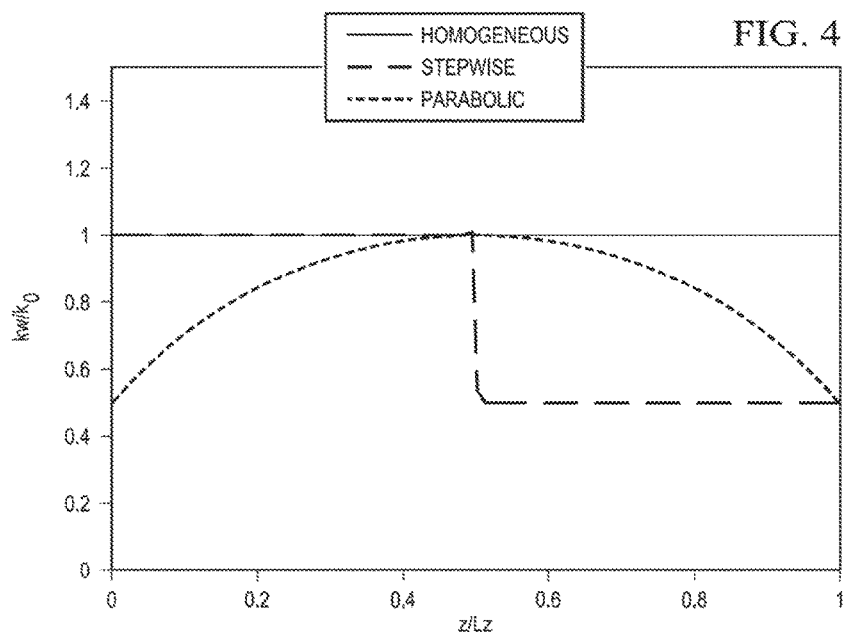
FIG. 4 is a diagram that illustrates an example of a graph that depicts reservoir permeability variation along a wellbore in accordance with the disclosed embodiments.

It is further assumed in these examples that the relative permeabilities of gas and oil k' are constant before and after the displacement front while experiencing jumps at the front location. The total permeability may still vary due to the local rock properties. In Examples 1 and 4, the absolute and relative permeabilities are set to a fixed value everywhere along the length of the wellbore. In contrast, in Examples 2 and 3, the absolute permeability varies along the well stepwise, as shown in FIG. 4. The position z/Lz=0 is the toe of the wellbore and z/Lz=1 is the heel of the wellbore. The porosity is assumed to be proportional to permeability, so that the ratio $k/\phi$ is constant.

Figure 5:
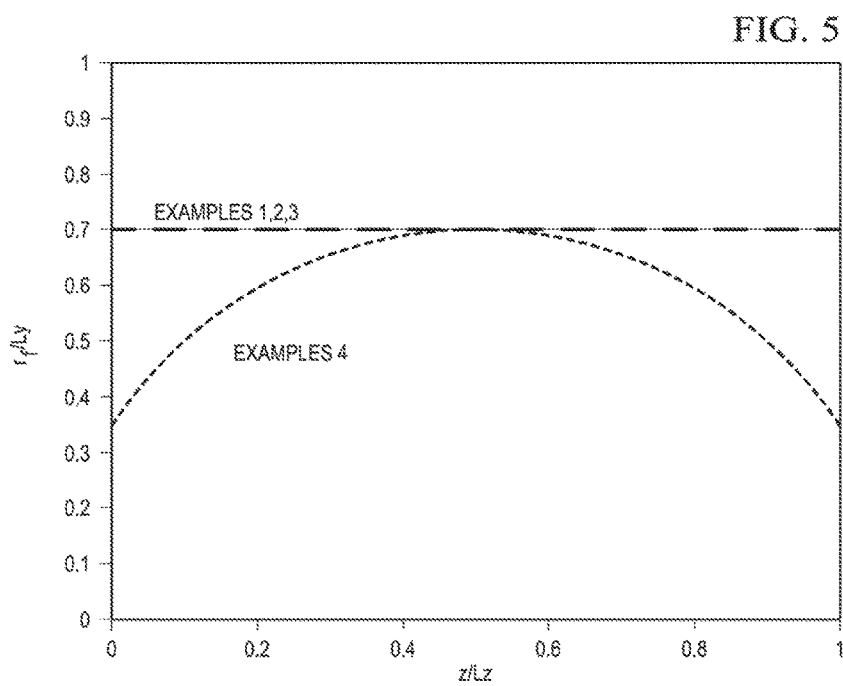
FIG. 5 is a diagram that illustrates an example of a graph that depicts a gas front profile along a wellbore in accordance with the disclosed embodiments.

FIG. 5 illustrates the target axial profile of injected gas. The gas front shape converges very well. The profiles of the first three example cases overlap with each other, matching the desired uniform distribution. In Example 4, the target gas injection front profile is set to be parabolic. It is interesting to note that a reduction of the reservoir permeability (as shown by dotted line in FIG. 4) results in an increase of the pressure gradients and, as a result, in a higher speed of front propagation $V_f$. In this situation, in order to obtain the constant from profile of the gas, additional pressure drop needs to be arranged using the FCDs, as shown by the dotted line in FIG. 6. A solid line is used to show the FCD distribution in the case of the uniform permeability profile of Examples 1-3.

FIG. 6 illustrates the optimal FCD distribution functions obtained by numerical iterations for Examples 1-4. In the simulated examples, all the iterations converge in less than ten steps. If the FCDs are placed equidistantly along the wellbore, the resulting distribution function $f(z)$ yields the required FCD diameter distribution using the below Equation (20). FIG. 7 illustrates the optimal FCD nozzle size\hole diameter distributions for Examples 1-4.

$$D_{nor} = [f^r(z)]^{1/4} D_{or} \quad (20)$$

Figure 8:
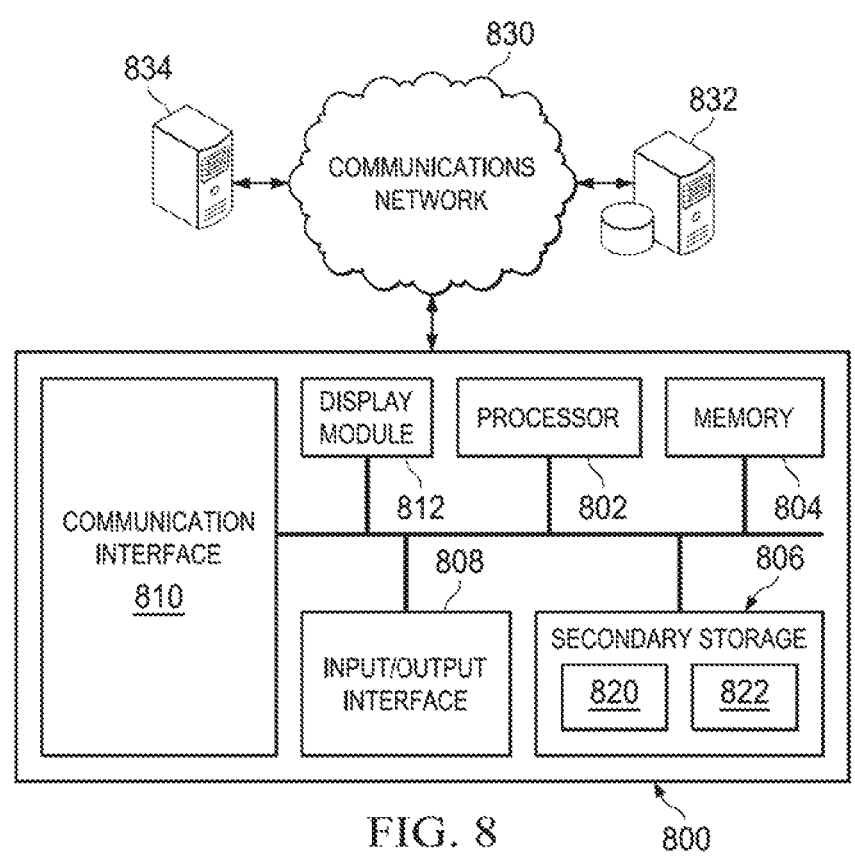
FIG. 8 is a block diagram illustrating an exemplary computer system for implementing the disclosed embodiments.

Referring now to FIG. 8, a block diagram illustrating one embodiment of a computer system 800 for implementing the features and functions of the disclosed embodiments is presented. The system 800 may be any type of computing device including, but not limited to, a desktop computer, a laptop, a server, a mainframe, a tablet, and a mobile device. The system 800 includes, among other components, a processor 802, memory 804, secondary storage unit 806, an input/output interface module 808, and a communication interface module 810.

The processor 802 may be any type microprocessor including single core and multi-core processors capable of executing instructions for performing the features and functions of the disclosed embodiments. The input/output interface module 808 enables the system 800 to receive user input (e.g., from a keyboard and mouse) and output information to one or more devices such as, but not limited to, printers, external data storage devices, and audio speakers. The system 800 may optionally include a separate display module 812 to enable information to be displayed on an integrated or external display device. For instance, the display module 812 may include instructions or hardware (e.g., a graphics card or chip) for providing enhanced graphics, touchscreen, and/or multi-touch functionalities associated with one or more display devices.

Memory 804 is volatile memory that stores currently executing instructions/data or instructions/data that are prefetched for execution. The secondary storage unit 806 is non-volatile memory for storing persistent data. The secondary storage unit 806 may be or include any type of data storage component such as a hard drive, a flash drive, or a memory card. In one embodiment, the secondary storage unit 806 stores the computer executable code/instructions and other relevant data for enabling a user to perform the features and functions of the disclosed embodiments.

For example, in accordance with the disclosed embodiments, the secondary storage unit 806 may permanently store executable code/instructions 820 for performing the above-described flow control device optimization process for accumulated gas injection. The instructions 820 associated with the flow control device optimization process are then loaded from the secondary storage unit 806 to memory 804 during execution by the processor 802 for performing the disclosed embodiments. In addition, the secondary storage unit 806 may store other executable code/instructions and data 822 such as, but not limited to, a wellbore simulator application and/or a reservoir simulation application for use with the disclosed embodiments.

The communication interface module 810 enables the system 800 to communicate with the communications network 830. For example, the network interface module 808 may include a network interface card and/or a wireless transceiver for enabling the system 800 to send and receive data through the communications network 830 and/or directly with other devices.

The communications network 830 may be any type of network including a combination of one or more of the following networks: a wide area network, a local area network, one or more private networks, the Internet, a telephone network such as the public switched telephone network (PSTN), one or more cellular networks, and wireless data networks. The communications network 830 may include a plurality of network nodes (not depicted) such as routers, network access points/gateways, switches, DNS servers, proxy servers, and other network nodes for assisting in routing of data/communications between devices.

For example, in one embodiment, the system 800 may interact with one or more servers 834 or databases 832 for performing the features of the disclosed embodiments. For instance, the system 800 may query the database 832 for well log information for creating a coupled wellbore-reservoir model in accordance with the disclosed embodiments. Further, in certain embodiments, the system 800 may act as a server system for one or more client devices or a peer system for peer to peer communications or parallel processing with one or more devices/computing systems (e.g., clusters, grids).

Accordingly, the disclosed embodiments provide a system and computer implemented method that is able to determine, using a numerical model and a simulation process, the optimum FCD properties, for example and without limitation, placement and other design parameters (e.g., number of holes and hole sizes, and/or number and types of FCDs), which would yield a prescribed profile of cumulative displaced oil volume in the formation. For example, the disclosed embodiments allow for the tailoring of the shape of the displacement front, thus yielding a desired injection profile. The disclosed embodiments also take into account the variation of reservoir formation parameters and fluid properties, which has wide potential applications for different reservoir conditions (for example, injection into fractured reservoirs). Vertical-horizontal anisotropy of permeabilities can also be accounted for by using effective permeabilities.

As stated above, one advantage of the disclosed embodiments is providing a capability to simulate FCD placement for gas injection, in contrast with conventional simulation techniques primarily relate to liquid injection or production. Due to the compressibility of gas, the modeling and simulation of gas behavior as disclosed herein is much more complicated than of liquid, which is usually treated as incompressible. The complexity may be attributed to one or more of the following issues relating to gas injection: (1) the pressure for gas phase is time-dependent, not steady or quasi-steady as for liquid; (2) during the update of pressure for each position at each timestep, large amount of calculations are involved in updating gas Equation of State; and (3) under the ultra-high pressure and temperature in the deepwater wells, the gas is highly compressed and its properties such as density, viscosity are far from that in ideal gas state. Thus a precise calculation of the gas phase Equation of State (EOS) is also a key factor to the successful application as disclosed herein.

Another advantage of the disclosed embodiments is that it can be applied to coupled wellbore-reservoir simulations of various complexity levels. Yet another advantage is that the disclosed simulation process is computationally efficient as it is optimized for a specific set of problems and is much simpler than a universal optimization method. In addition, the disclosed process exhibits an excellent convergence as it does not involve the Lagrange multipliers. Further, the disclosed process can be easily applied to any coupled wellbore-reservoir model, including the most complicated ones.

As stated above, a traditional approach for flow control device placement/optimization involves running multiple reservoir models and choosing the best design (which is usually good, but not optimal) from a set of simulations with different completion placements. In contrast, application of the disclosed embodiments would not only yield to the best placement/optimization design, but also substantially reduce the total computational effort.

In certain embodiments, the disclosed embodiments may be used to provide a very good initial guess for CPU-expensive simulations involving detailed 3D models (for example field reservoir simulations), thus saving days of simulation time. In one embodiment, the disclosed processes may be integrated into production simulation software package (e.g., NETool™). Moreover, the disclosed process is flexible enough to account for many physical phenomena and reservoir conditions that might be not captured by the reservoir simulator model but be seen in the formation from the log measurements. Additionally, in certain embodiments, vertical-horizontal anisotropy of permeabilities can be accounted for by using effective permeabilities.

As described above, the disclosed embodiments are particularly useful for determining optimal flow control device properties for a gas injection well, the method comprising. In one embodiment of the present disclosure, a computer-implemented method for determining flow control device properties for a gas injection well includes: initializing a flow control device distribution function based on a uniform flow control device distribution profile; determining a position of a displaced oil volume front corresponding to a desired volume of displaced oil by using the initialized flow control device distribution function to simulate a distribution of injected gas flow in the gas injection well over a period of time; adjusting the flow control device distribution function based on results of the simulation and a predetermined reference location along a length of the gas injection well, where the predetermined reference location corresponds to a target gas injection profile; determining a deviation between a shape of the displaced oil volume front obtained using the adjusted flow control device distribution function and the target gas injection profile; determining whether the deviation is within a predetermined convergence range; if the deviation is determined not to be within the predetermined convergence range, repeating the simulation and adjustment of the flow control device distribution function until the deviation is determined to be within the predetermined convergence range; and if the deviation is determined to be within the predetermined convergence range, determining the flow control device properties for the gas injection well using the adjusted flow control device distribution function, where the determined flow control device properties yield the target gas injection profile along the gas injection well.

In a further embodiment, the reference location along the gas injection well satisfies a condition of having a minimum ratio between a current gas injection front and a target gas injection front. In yet a further embodiment, adjusting the flow control device distribution function includes increasing values of the flow control device distribution function at points where the current gas injection front is not sufficiently advanced compared to the target gas injection front and decreasing values at points where the current injected gas front overshoots the target gas injection front. In yet a further embodiment, the predetermined convergence range includes values within 10-5 of the desired volume of displaced oil. In yet a further embodiment, the reference location along the length of the gas injection well does not change during subsequent iterations of the simulation and adjustment of the flow control device distribution function performed in response to a determination that the deviation is not within the predetermined convergence range. In yet a further embodiment, the target gas injection profile is non-uniform. In yet a further embodiment, the target gas injection profile is uniform. In yet a further embodiment, determining the flow control device properties includes determining various hole diameters of flow control devices along the length of the gas injection well. In yet a further embodiment, determining the flow control device properties includes determining a distance distribution of flow control devices along the length of the gas injection well.

In another embodiment of the present disclosure, a system includes at least one processor; and at least one memory that is coupled to the at least one processor and that stores processor executable instructions for determining flow control device properties for a gas injection well, which when executed by the processor cause the processor to perform a plurality of operations, including operations for: initializing a flow control device distribution function based on a uniform flow control device distribution profile; determining a position of a displaced oil volume front corresponding to a desired volume of displaced oil by using the initialized flow control device distribution function to simulate a distribution of injected gas flow in the gas injection well over a period of time; adjusting the flow control device distribution function based on results of the simulation and a predetermined reference location along a length of the gas injection well, where the predetermined reference location corresponds to a target gas injection profile; determining deviation between a shape of the displaced oil volume front obtained using the adjusted flow control device distribution function and the target gas injection profile; determining whether the deviation is within a predetermined convergence range; if the deviation is determined not to be within the predetermined convergence range, repeating the simulation and adjustment of the flow control device distribution function until the deviation is determined to be within the predetermined convergence range; and if the deviation is determined to be within the predetermined convergence range, determining the flow control device properties for the gas injection well using the adjusted flow control device distribution function, where the determined flow control device properties yield the target gas injection profile along the gas injection well.

In yet another embodiment of the present disclosure, a non-transitory computer readable medium includes computer executable instructions for determining flow control device properties for a gas injection well, which when executed by a computer cause the computer to perform a plurality of operations, including operations for: initializing a flow control device distribution function based on a uniform flow control device distribution profile; determining a position of a displaced oil volume front corresponding to a desired volume of displaced oil by using the initialized flow control device distribution function to simulate a distribution of injected gas flow in the gas injection well over a period of time; adjusting the flow control device distribution function based on results of the simulation and a predetermined reference location along a length of the gas injection well, where the predetermined reference location corresponds to a target gas injection profile; determining a deviation between a shape of the displaced oil volume front obtained using the adjusted flow control device distribution function and the target gas injection profile; determining whether the deviation is within a predetermined convergence range; if the deviation is determined not to be within the predetermined convergence range, repeating the simulation and adjustment of the flow control device distribution function until the deviation is determined to be within the predetermined convergence range; and if the deviation is determined to be within the predetermined convergence range, determining the flow control device properties for the gas injection well using the adjusted flow control device distribution function, where the determined flow control device properties yield the target gas injection profile along the gas injection well.

While specific details about the above embodiments have been described, the above hardware and software descriptions are intended merely as example embodiments and are not intended to limit the structure or implementation of the disclosed embodiments. For instance, although ninny other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While many specific example embodiments are described above, the above examples are not intended to be exhaustive or limit the invention in the form disclosed. Many modifications and variations will be apparent to those of ordinary skill in the art without departing from the scope and spirit of the invention. The scope of the claims is intended to broadly cover the disclosed embodiments and any such modification.

What is claimed is:

1. A computer-implemented method for determining flow control device properties for a gas injection well within a formation, the method comprising:
    simulating, by a computer system, injected gas flow from the gas injection well into the formation to determine a position of a displaced oil volume front within the formation, based on a flow control device distribution function and a uniform distribution profile for flow control devices along the gas injection well;
    adjusting, by the computer system, the flow control device distribution function based on results of the simulation and a predetermined reference location along a length of the gas injection well, the predetermined reference location corresponding to a target gas injection profile that yields a prescribed shape of the displaced oil volume front within the formation;
    determining, by the computer system, whether a deviation between a shape of the displaced oil volume front obtained using the adjusted flow control device distribution function and the prescribed shape of the displaced oil volume front according to the target gas injection profile is within a predetermined convergence range;
    when the deviation is determined not to be within the predetermined convergence range, repeating the simulation and the adjustment of the flow control device distribution function until the deviation is determined to be within the predetermined convergence range;
    when the deviation is determined to be within the predetermined convergence range, determining the flow control device properties that yield the target gas injection profile along the gas injection well, based on the flow control device distribution function; and
    performing gas injection by using the flow control devices along the gas injection well to control a flow of gas injected into the formation, based on the determined flow control device properties.

2. The computer implemented method of claim 1, wherein the reference location along the gas injection well satisfies a condition of having a minimum ratio between a current gas injection front and a target gas injection front.

3. The computer implemented method of claim 2, wherein adjusting the flow control device distribution function comprises:
    increasing values of the flow control device distribution function at points where the current gas injection front is not sufficiently advanced compared to the target gas injection front; and
    decreasing values at points where the current injected gas front overshoots the target gas injection front.

4. The computer implemented method of claim 1, wherein the predetermined convergence range includes values within $10^{-5}$ of the desired volume of displaced oil.

5. The computer implemented method of claim 1, wherein the reference location along the length of the gas injection well does not change during subsequent iterations of the simulation and adjustment of the flow control device distribution function performed in response to a determination that the deviation is not within the predetermined convergence range.

6. The computer implemented method of claim 1, wherein the target gas injection profile is non-uniform.

7. The computer implemented method of claim 1, wherein the target gas injection profile is uniform.

8. The computer implemented method of claim 1, wherein determining the flow control device properties includes determining various hole diameters of flow control devices along the length of the gas injection well.

9. The computer implemented method of claim 1, wherein determining the flow control device properties includes determining a distance distribution of flow control devices along the length of the gas injection well.

10. A system comprising:
    at least one processor; and
    at least one memory coupled to the at least one processor and storing processor executable instructions, which when executed by the processor causes the processor to perform a plurality of operations, including operations for:
    simulating injected gas flow from the gas injection well into the formation to determine a position of a displaced oil volume front within the formation, based on a flow control device distribution function and a uniform distribution profile for flow control devices along the gas injection well;
    adjusting the flow control device distribution function based on results of the simulation and a predetermined reference location along a length of the gas injection well, the predetermined reference location corresponding to a target gas injection profile that yields a prescribed shape of the displaced oil volume front within the formation;
    determining whether a deviation between a shape of the displaced oil volume front obtained using the adjusted flow control device distribution function and the prescribed shape of the displaced oil volume front according to the target gas injection profile is within a predetermined convergence range;
    when the deviation is determined not to be within the predetermined convergence range, repeating the simulation and the adjustment of the flow control device distribution function until the deviation is determined to be within the predetermined convergence range; and when the deviation is determined to be within the predetermined convergence range, determining the flow control device properties that yield the target gas injection profile along the gas injection well, based on the flow control device distribution function, wherein gas injection is performed by using the flow control devices along the gas injection well to control a flow of gas injected into the formation in accordance with the determined flow control device properties.

11. The system of claim 10, wherein the reference location along the gas injection well satisfies a condition of having a minimum ratio between a current gas injection front and a target gas injection front.

12. The system of claim 11, wherein adjusting the flow control device distribution function comprises:

increasing values of the flow control device distribution function at points where the current gas injection front the injected gas front is not sufficiently advanced compared to a the target gas injection front; and decreasing values at points where the current injected gas front overshoots where the target gas injection front.

13. The system of claim 10, wherein the predetermined convergence range includes values within $10^{-5}$ of the desired volume of displaced oil.

14. The system of claim 10, wherein the reference location along the length of the gas injection well does not change during subsequent iterations of the simulation and adjustment of the flow control device distribution function performed in response to a determination that the deviation is not within the predetermined convergence range.

15. The system of claim 10, wherein the target gas injection profile is non-uniform.

16. The system of claim 10, wherein the target gas injection profile is uniform.

17. The system of claim 10, wherein determining the flow control device properties includes determining various hole diameters of flow control devices along the length of the gas injection well.

18. The system of claim 10, wherein determining the flow control device properties includes determining a distance distribution of flow control devices along the length of the gas injection well.

19. A non-transitory computer readable medium comprising computer executable instructions, which when executed by a computer cause the computer to perform a plurality of operations, including operations for:

simulating injected gas flow from the gas injection well into the formation to determine a position of a displaced oil volume front within the formation, based on a flow control device distribution function and a uniform distribution profile for flow control devices along the gas injection well;

adjusting the flow control device distribution function based on results of the simulation and a predetermined reference location along a length of the gas injection well, the predetermined reference location corresponding to a target gas injection profile that yields a prescribed shape of the displaced oil volume front within the formation;

determining whether a deviation between a shape of the displaced oil volume front obtained using the adjusted flow control device distribution function and the prescribed shape of the displaced oil volume front according to the target gas injection profile is within a predetermined convergence range;

when the deviation is determined not to be within the predetermined convergence range, repeating the simulation and the adjustment of the flow control device distribution function until the deviation is determined to be within the predetermined convergence range; and when the deviation is determined to be within the predetermined convergence range, determining the flow control device properties that yield the target gas injection profile along the gas injection well, based on the flow control device distribution function, wherein gas injection is performed by using the flow control devices along the gas injection well to control a flow of gas injected into the formation in accordance with the determined flow control device properties.

20. The non-transitory computer readable medium of claim 19, wherein determining the flow control device properties includes determining hole diameters for the flow control devices along the length of the gas injection well.

* * * * *

UNITED STATES PATENT AND TRADEMARK OFFICE
CERTIFICATE OF CORRECTION

PATENT NO. : 10,287,856 B2
APPLICATION NO. : 15/104156
DATED : May 14, 2019
INVENTOR(S) : Andrey Filippov, Jianxin Lu and Vataly Anatolievich Khoriakov It is certified that error appears in the above-identified patent and that said Letters Patent is hereby corrected as shown below:

In the Specification

Column 4, Line 50, change:

" $$\phi c_s \frac{\partial p}{\partial t} = \frac{1}{[\xi(r_f - r_0) + r_0]} \frac{1}{(r_f - r_0)} \frac{1}{\partial \xi}\left[ (\xi(r_f - r_0) + r_0)\lambda \frac{\partial p}{\partial \xi} \frac{1}{(r_f - r_0)} \right] \quad (4)$$ "

To:

-- $$\phi c_g \frac{\partial p}{\partial t} = \frac{1}{[\xi(r_f - r_0) + r_0]} \frac{1}{(r_f - r_0)} \frac{1}{\partial \xi}\left[ (\xi(r_f - r_0) + r_0)\lambda \frac{\partial p}{\partial \xi} \frac{1}{(r_f - r_0)} \right] \quad (4)$$ --

Column 6, Line 6, change:

" $$f_d = \begin{cases} 64/Re, & \text{if } Re < 2300; \\ \left\{-1.8\log_{10}\left[\left(\frac{\varepsilon/D}{3.7}\right)^{30/9} + \frac{6.9}{Re}\right]\right\}^{-2}, & \text{if } Re > 2300. \end{cases} \quad (11)$$ "

To:

-- $$f_d = \begin{cases} 64/Re, & \text{if } Re < 2300; \\ \left\{-1.8\log_{10}\left[\left(\frac{\varepsilon/D}{3.7}\right)^{10/9} + \frac{6.9}{Re}\right]\right\}^{-2}, & \text{if } Re > 2300. \end{cases} \quad (11)$$ --

Column 8, Line 54, change:
" $D_{nor} = [f'(z)]^{1/4} D_{or}$ (20)"
To:
-- $D_{new} = [f'(z)]^{1/4} D_{or}$ (20)--

Signed and Sealed this
Fifteenth Day of October, 2019

Andrei Iancu
*Director of the United States Patent and Trademark Office*